(12) United States Patent
Araki et al.

(10) Patent No.: US 6,228,141 B1
(45) Date of Patent: May 8, 2001

(54) NICKEL FINE POWDER AND METHOD FOR PREPARING THE SAME

(75) Inventors: Takayuki Araki; Yoshiharu Toshima; Yasuhide Yamaguchi; Takao Hayashi, all of Yamaguchi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/559,488

(22) Filed: Apr. 27, 2000

(30) Foreign Application Priority Data

Apr. 28, 1999 (JP) .................................. 11-122550

(51) Int. Cl.$^7$ ....................................... B22F 1/00

(52) U.S. Cl. .............................. 75/255; 75/374

(58) Field of Search ....................... 75/255, 374

(56) References Cited

U.S. PATENT DOCUMENTS

| | | | |
|---|---|---|---|
| 3,775,099 | * 11/1973 | Coffield et al. | 75/119 |
| 3,850,612 | * 11/1974 | Montino et al. | 75/5 |
| 4,072,781 | * 2/1978 | Shirahata et al. | 428/336 |
| 4,089,676 | * 5/1978 | Grundy | 75/5 AA |
| 4,215,190 | * 7/1980 | Ferrando et al. | 429/222 |
| 4,940,553 | * 7/1990 | Von Benda et al. | 252/82.1 |
| 5,443,619 | * 8/1995 | McDoulett, Jr. et al. | 75/421 |
| 6,120,576 | * 9/2000 | Toshima et al. | 75/370 |

* cited by examiner

*Primary Examiner*—Daniel Jenkins
(74) *Attorney, Agent, or Firm*—Young & Thompson

(57) ABSTRACT

Nickel fine powder comprises nickel and phosphorus dispersed in the nickel in an amount ranging from 0.01 to 2% by weight on the basis of the weight of the nickel and having a particle size of not more than 0.5 μm. The nickel fine powder can be prepared by a method comprising the step of reducing nickel hydroxide in the presence of phosphorus ions in such an amount that the molar ratio of phosphorus ions to nickel ions falls within the range of from 0.01 to 2.

12 Claims, No Drawings

NICKEL FINE POWDER AND METHOD FOR PREPARING THE SAME

BACKGROUND OF THE INVENTION (a) Field of the Invention

The present invention relates to nickel fine powder comprising nickel and a trace amount of phosphorus dispersed in the nickel as well as a method for preparing the same and more particularly to nickel fine powder which comprises nickel and a trace amount of phosphorus dispersed in the nickel, whose particle size is uniform and which is excellent in resistance to heat shrinkage as well as a method for preparing the same.

(b) Description of the Prior Art

Heretofore, there have been proposed a variety of methods for the preparation of nickel fine powder. These methods can roughly divided into two categories, one of which is a dry method comprising the steps of using a nickel salt such as nickel chloride as a starting material, subjecting the nickel salt to vapor-phase reduction with hydrogen and then cooling the resulting nickel vapor to give nickel fine powder; and the other of which is a wet method comprising the steps of mixing an aqueous solution containing a nickel salt such as nickel chloride with an aqueous solution of an alkali hydroxide to form nickel hydroxide and then reducing the resulting nickel hydroxide to give nickel fine powder.

Moreover, regarding methods for controlling the particle size of nickel fine powder, there have been known, for instance, those comprising adjusting the nickel salt vapor concentration and/or the amount of hydrogen gas to be introduced during the reduction step for the dry preparation method; and those comprising controlling, for instance, the concentration of each reaction component, the reaction temperature and the kinds and concentrations of additives, for the wet preparation method. However, there can be prepared simply nickel fine powder whose average particle size falls within the range of from 0.2 to 0.5 μm, even if nickel fine powder having a small particle size is prepared according to either of the foregoing preparation methods.

It is difficult to prepare nickel fine powder having a average particle size smaller than that defined above according to the presently existing technology. In particular, there has never been proposed any technique for the steady preparation of nickel fine powder whose particle size is uniform and is less than 0.2 μm.

SUMMARY OF THE INVENTION

Accordingly, it is an object of the present invention to provide nickel fine powder which comprises nickel and a trace amount of phosphorus dispersed in the nickel, whose particle size is uniform and is not more than 0.5 μm, in particular less than 0.2 μm and which is excellent in the resistance to heat shrinkage as well as a method for easily and steadily preparing such nickel fine powder.

The inventors of this invention have conducted various studies to achieve the foregoing object, have found that if nickel fine powder is prepared by reducing nickel hydroxide in the presence of a specific amount of phosphorus ions, the particle size of the resulting nickel fine powder is reduced in proportion to the amount of the coexisting phosphorous ions, that this would permit the quite easy control of the particle size and the steady preparation of nickel fine powder whose particle size is quite uniform, that the resulting nickel fine powder comprises nickel and a trace amount of phosphorus dispersed in the nickel and that the phosphorus-containing nickel fine powder is quite excellent in its resistance to heat shrinkage, and thus have completed the present invention on the basis of these findings.

According to an aspect of the present invention, there is provided nickel fine powder which comprises nickel and phosphorus dispersed in the nickel in an amount ranging from 0.01 to 2% by weight based on the weight of the nickel, and whose particle size is not more than 0.5 μm.

The nickel fine powder of the present invention is further characterized by the fact that it has a rate of linear heat shrinkage, as determined at 1000° C. of not higher than 8%.

The rate of linear heat shrinkage as determined at 1000° C. is herein defined by the following expression:

$$R = \frac{L-l}{L} \times 100$$

wherein,

R=rate of linear heat shrinkage as determined at 1000° C.

L=length of specimen determined at room temperature, l=length of specimen determined at 1000° C.

According to another aspect of the present invention, there is provided a method for preparing nickel fine powder which comprises nickel and phosphorus dispersed in the nickel in an amount ranging from 0.01 to 2% by weight based on the weight of the nickel, and whose particle size is not more than 0.5 μm. The method comprises the step of reducing nickel hydroxide in the presence of phosphorus ions in such an amount that the molar ratio thereof to nickel ions ranges from 0.01 to 2 to give the nickel fine powder.

According to a further aspect of the present invention, there is also provided another method for preparing nickel fine powder which comprises nickel and phosphorus dispersed in the nickel in an amount ranging from 0.01 to 2% by weight based on the weight of the nickel, and whose particle size is not more than 0.5 μm. The method comprises the steps of mixing an aqueous solution of a nickel salt with an aqueous solution of an alkali hydroxide to form nickel hydroxide and reducing the resulting nickel hydroxide to give nickel fine powder, wherein a phosphorus ion source is added to the reaction system at any stage of the production method to thus reduce the nickel hydroxide in the presence of phosphorus ions in such an amount that the molar ratio thereof to nickel ions ranges from 0.01 to 2.

DESCRIPTION OF THE PREFERRED EMBODIMENTS

The nickel fine powder of the present invention comprises nickel and phosphorus dispersed in the nickel in an amount ranging from 0.01 to 2% by weight based on the weight of the nickel. The presence of phosphorus in the nickel ensures the improvement of the resistance to heat shrinkage of the powder. When nickel fine powder is heated and sintered in a nitrogen gas atmosphere, the conventional nickel fine powder free of any phosphorus shows not less than 10% of linear heat shrinkage as determined at 1000° C., while the phosphorus-containing nickel fine powder according to the present invention has a rate of linear heat shrinkage as determined at 1000° C. smaller than that observed for the conventional nickel fine powder, although the phosphorus-containing nickel fine powder is finer than the conventional nickel fine powder. For instance, the nickel fine powder of the present invention has a rate of linear heat shrinkage, as determined at 1000° C., of not more than 8% even if the particle size thereof is 0.01 μm. In other words, the phosphorus-containing nickel fine powder of the invention has such characteristic properties that the linear heat shrinkage is very low as compared with the conventional nickel fine powder free of any phosphorus.

The advantage due to the foregoing characteristic properties would be exhibited in particular when the nickel fine powder of the invention is used, for instance, as a material for internal electrodes of laminated ceramic condensers. Such a laminated ceramic condenser is manufactured by alternatively putting ceramic dielectric material and internal electrodes in layers, then attaching them together under press and unifying them through firing. When using the conventional nickel fine powder free of any phosphorus, nickel undergoes shrinkage at a low temperature during the firing step because of the difference in the rate of linear heat shrinkage between a ceramic dielectric material (e.g., $BaTiO_3$) and the nickel electrode. Contrary to this, the linear heat shrinkage is inhibited due to the presence of phosphorus dispersed in the nickel in case of the phosphorus-containing nickel fine powder of the invention and this accordingly results in the reduction of the difference in the rate of linear heat shrinkage between the ceramic dielectric material and the nickel electrode, although the nickel fine powder of the invention is finer than the conventional one. The nickel fine powder of the invention thus permits the production of a laminated ceramic condenser free of any crack and delamination.

The nickel fine powder of the invention is prepared by reducing nickel hydroxide in the coexistence of phosphorus ions in such an amount that the molar ratio of phosphorus ions to nickel ions ranges from 0.01 to 2. As the amount of phosphorus ions present in the reaction system increases, the phosphorus content in the resulting nickel correspondingly increases and the particle size of the resulting nickel fine powder is reduced. Thus, the present invention permits the quite easy control of the particle size of the resulting nickel fine powder and the steady production of nickel fine powder having a uniform particle size.

As has been discussed above, the phosphorus content in the resulting nickel is closely correlated with the particle size of the nickel fine powder and therefore, the phosphorus content should be not less than 0.01% by weight on the basis of the weight of the nickel present in the resulting nickel fine powder, in order to obtain nickel fine powder having a desired particle size of not more than 0.5 μm. The particle size of the nickel fine powder is reduced in proportion to the phosphorus content till the content reaches 1% by weight, and the effect of the phosphorus content on the reduction of the particle size is gradually lowered within a phosphorus content of more than 1% by weight and not more than 2% by weight. The effect is not significant if the phosphorus content exceeds 2% by weight. Consequently, the phosphorus content of the resulting nickel ranges from 0.01 to 2% by weight, preferably 0.02 to 1.5% by weight and more preferably 0.1 to 1.5% by weight.

According to the preparation method of the present invention, nickel hydroxide is reduced in the presence of phosphorus ions in such an amount that the molar ratio of phosphorus ions to nickel ions falls within the range of from 0.01 to 2. The nickel hydroxide can be formed by, for instance, admixing an aqueous solution of a nickel salt with an aqueous solution of an alkali hydroxide. The aqueous solution of the nickel salt can be reacted with the aqueous solution of the alkali hydroxide according to any method well-known in the art.

For instance, when mixing the aqueous solution of a nickel salt with the aqueous solution of an alkali hydroxide may be carried out at a stroke, but it is preferred to gradually add one of the aqueous solutions to the other aqueous solution. For instance, an aqueous solution of a nickel salt is gradually added to an aqueous solution of an alkali hydroxide over 5 to 60 minutes to thus mix them and to give nickel hydroxide. In this respect, if the rate of addition is high or the addition is completed within a short period of time, the viscosity of the reaction liquid increases and this has a tendency to impair the subsequent reducing reaction. On the other hand, if the rate of the addition is low or the addition is continued over a long period of time, the reaction product and the reaction liquid are not adversely affected by such an addition operation, but the addition step requires a long period of time and this would impair the production efficiency.

The foregoing nickel salts may be, for instance, nickel sulfate, nickel halides and nickel nitrate. In addition, examples of alkali hydroxides usable herein are sodium hydroxide, potassium hydroxide, ammonium hydroxide, and calcium hydroxide. These nickel salts and alkali hydroxides are preferably highly pure products such as those of guaranteed or primary grade. If using starting materials of low grade, there is observed such a tendency that the resulting nickel fine powder has a large particle size or that the particle size distribution widely varies, because of the presence of impurities originated from the starting compounds.

In the preparation method according to the present invention, examples of phosphorus ion sources include phosphorus atom-containing compounds, which are water-soluble, capable of being dissociated, such as phosphoric acid, ammonium phosphate, ammonium hydrogen phosphate, sodium hydrogen phosphate, potassium phosphate, sodium phosphate, phosphorous acid, potassium phosphite, sodium phosphite, hypophosphorous acid, potassium hypophosphite, calcium hypophosphite, or sodium hypophosphite. In particular, an excellent effect can be obtained when using hypophosphorous acid or a metal hypophosphite.

In the preparation method of the present invention, it is essential to reduce nickel hydroxide in the presence of phosphorus ions in such an amount that the molar ratio thereof to nickel ions ranges from 0.01 to 2. However, the phosphorus ion source may be added to the method for preparing the nickel fine powder in any step. For instance, a phosphorus ion source may be added to the aqueous solution of a nickel salt or the aqueous solution of an alkali hydroxide; or it may be added to the nickel salt aqueous solution immediately before the addition of a reducing agent to the solution; or the addition may be carried out according to any combination of the foregoing addition methods, i.e., it may be added to the reaction system at two or more different stages.

In the preparation method according to the present invention, the phosphorus content in the resulting nickel fine powder increases and the particle size of the resulting nickel fine powder is reduced, in proportion to the increase in the amount of the coexisting phosphorus ions during the reduction of nickel hydroxide. For this reason, it is quite easy to control the particle size of the resulting nickel fine powder and the nickel fine powder whose particle size is uniform can steadily be prepared. To ensure the achievement of such an effect, the molar ratio of phosphorus ions to nickel ions is preferably not less than 0.01. In this regard, the use of phosphorus ions in a molar ratio of more than 2 never provides any conspicuous effect in proportion to the amount of the ions. The preferred molar ratio of phosphorus ions to nickel ions when practicing the preparation method of the invention is determined by the desired particle size of the nickel fine powder to be prepared.

In the preparation method according to the present invention, the reduction of nickel hydroxide can be carried out using reducing agent widely used in this field such as hydrazine type reducing agents or sodium borohydride. Hypophosphorous acid or a hypophosphite usable in the present invention as the phosphorus ion source exhibits, in itself, a weak reducing action, but such a phosphorus ion source never shows its reducing ability under such a condition that the molar ratio of phosphorus ions to nickel ions is not more than 2, which is an essential requirement in the method of the present invention. Therefore, a reducing agent such as hydrazine or sodium borohydride should be added to the reaction system to carry out the reduction.

In the preparation method according to the present invention, the reduction of nickel hydroxide can be carried out by adding at a time or gradually the reducing agent to the aqueous solutions of nickel hydroxide, while maintaining the temperature of the reaction system to 50 to 80° C. to thus reduce nickel hydroxide and then the resulting reduced product is recovered.

The present invention will hereinafter be described in more detail with reference to the following working Examples and Comparative Examples, but the present invention is not restricted to these specific Examples at all.

EXAMPLES 1 to 9 AND COMPARATIVE EXAMPLE 1

To 400 ml of pure water (warmed water heated to 55° C. was used for ensuring immediate and complete dissolution), there were added 224 g of nickel sulfate ($NiSO_4.6H_2O$) and sodium hypophosphite ($NaPH_2O_2.H_2O$), as a phosphorus ion source, in an amount specified in the following Table 1 (the ratio of the molar amount of phosphorus ions to that of nickel ions, molar ratio) to thus dissolve them in water and to give an aqueous solution, followed by gradual dropwise addition of the resulting aqueous solution to an aqueous solution prepared by dissolving 100 g of sodium hydroxide in 1500 ml of pure water to thus cause a reaction therebetween.

The hydroxide-containing slurry thus prepared was heated up to 60° C. and then 150 g of hydrazine hydrate was gradually dropwise added to the slurry to thus reduce the hydroxide.

The resulting nickel fine powder comprising nickel and phosphorus dispersed in the nickel was washed with pure water. The water washing was continued till the pH of the wash liquid reached a level of not more than 10, followed by the filtration according to the usual method, drying at 70° C. to thus give phosphorus-containing nickel fine powder.

The resulting phosphorus-containing nickel fine powder was inspected for the phosphorus content present in nickel in terms of "% by weight" based on the weight of the nickel, the particle size ($\mu m$) thereof was determined by the SEM observation and the specific surface area ($m^2/g$) thereof was determined by the BET method. These results are summarized in the following Table 1.

TABLE 1

|  | Added Amount of P Source, Molar Ratio | P Content, wt % | SEM Particle Size, $\mu m$ | Specific Surface Area, $m^2/g$ |
|---|---|---|---|---|
| Com. Ex. 1 | 0 | <0.01 | 0.57 | 2.5 |
| Ex. 1 | 0.01 | 0.02 | 0.43 | 3.3 |
| Ex. 2 | 0.02 | 0.03 | 0.35 | 4.8 |
| Ex. 3 | 0.1 | 0.14 | 0.17 | 6.0 |
| Ex. 4 | 0.2 | 0.25 | 0.12 | 7.9 |
| Ex. 5 | 0.4 | 0.33 | 0.10 | 8.7 |
| Ex. 6 | 0.8 | 0.68 | 0.08 | 16.2 |
| Ex. 7 | 1.0 | 0.81 | 0.07 | 13.5 |
| Ex. 8 | 1.2 | 1.01 | 0.06 | 14.9 |
| Ex. 9 | 1.5 | 1.51 | 0.06 | 14.3 |

The data listed in Table 1 clearly indicate that the particle size of the resulting nickel fine powder is reduced and the specific surface area thereof increases as the phosphorus content in the nickel matrix increases.

In addition, it was confirmed by the SEM observation that the resulting nickel fine powder had a quite uniform particle size. Furthermore, nickel fine powder was repeatedly prepared under the same conditions and it was thus found that there was scarcely observed any difference in particle size between different lots.

EXAMPLE 10

The same procedures used in Examples 1 to 9 were repeated except that 68 g of a hypophosphorous acid solution (purity of $HPH_2O_2$:33%) (the molar ratio of phosphorus ions to nickel ions was found to be 0.4) was substituted for the sodium hypophosphite used in Examples 1 to 9 to give nickel fine powder.

The resulting phosphorus-containing nickel fine powder was inspected for the phosphorus content present in nickel in terms of "% by weight" based on the weight of the nickel, the particle size thereof was determined by the SEM observation and the specific surface area thereof was determined by the BET method. These values were substantially identical to those observed for the nickel fine powder prepared in Example 5.

EXAMPLE 11

To 400 ml of pure water (warmed water heated to 55° C. was used for ensuring fast and complete dissolution), there was dissolved 224 g of nickel sulfate ($NiSO_4.6H_2O$) to give an aqueous solution, followed by gradual dropwise addition of the aqueous solution to an aqueous solution prepared by dissolving 100 g of sodium hydroxide in 1500 ml of pure water.

To the hydroxide-containing slurry thus prepared, there was added 36 g of sodium hypophosphite ($NaPH_2O_2.H_2O$) (the molar ratio of phosphorus ions to nickel ions was found to be 0.4) to thus dissolve the latter in the former, followed by heating the resulting solution up to 60° C. and the reduction of the hydroxide by gradually and dropwise adding 150 g of hydrazine to the resulting solution.

The nickel fine powder thus prepared, which comprised nickel and phosphorus dispersed in the nickel, was washed with pure water. The water washing was continued till the pH value of the wash liquid reached a level of not more than 10, followed by the filtration thereof according to the usual method and drying at a temperature of 70° C. to give phosphorus-containing nickel fine powder.

The resulting phosphorus-containing nickel fine powder was inspected for the phosphorus content present in nickel in terms of "% by weight" based on the weight of the nickel and the particle size thereof was determined by the SEM observation. The specific surface area thereof was determined by the BET method. The results thus obtained are summarized below:

| | |
|---|---|
| Phosphorus content: | 0.5% by weight |
| SEM Particle Size: | 0.09 μm |
| Specific Surface Area: | 11.5 m$^2$/g |

EXAMPLE 12

The phosphorus-containing nickel fine powdery products prepared in the foregoing Examples 1, 3, 4, 6 and 8 and Comparative Example 1 were inspected for the rate of linear heat shrinkage by heating them up to 1000° C. at a heating rate of 10° C. min in a nitrogen gas atmosphere, using an apparatus for thermomechanical analysis (TMA/SS6000 available from Seiko Instruments, Inc.). The results thus obtained are listed in the following Table 2.

TABLE 2

| Nickel Fine powder | Rate of Linear Heat shrinkage determined at 1000° C. |
|---|---|
| Fine powder of Comparative Example 1 | 11.8% |
| Fine Powder of Example 1 | 7.9% |
| Fine Powder of Example 3 | 7.3% |
| Fine Powder of Example 4 | 6.9% |
| Fine Powder of Example 6 | 3.8% |
| Fine Powder of Example 8 | 2.8% |

As will be clear from the data listed in Table 2, all the rates of linear heat shrinkage observed for the phosphorus-containing nickel fine powder prepared in Examples 1, 3, 4, 6, and 8, as determined at 1000° C., are not more than 8%, while that observed for the nickel fine powder of Comparative Example 1 is not less than 10%. This clearly indicates that the nickel fine powder of the present invention is excellent in the resistance to heat shrinkage.

As has been described above in detail, the nickel fine powder of the present invention comprises nickel and a trace amount of phosphorus atom, has a uniform particle size on the order of not more than 0.5 μm, in particular less than 0.2 μm and is also excellent in resistance to heat shrinkage. Therefore, the nickel fine powder of the invention is suitably used as a material for internal electrodes of laminated ceramic condensers. Moreover, the method of the present invention permits easy and steady preparation of such nickel fine powder.

What is claimed is:

1. Nickel fine powder comprising nickel and phosphorus dispersed in the nickel in an amount ranging from 0.01 to 2% by weight on the basis of the weight of the nickel and having a particle size of not more than 0.5 μm.

2. The nickel fine powder of claim 1 wherein the phosphorus content ranges from 0.1 to 2% by weight on the basis of the weight of the nickel and the particle size is less than 0.2 μm.

3. The nickel powder of claim 1 wherein the rate of linear heat shrinkage as determined at 1000° C. is not more than 8%.

4. The nickel powder of claim 2 wherein the rate of linear heat shrinkage as determined at 1000° C. is not more than 8%.

5. A method for preparing nickel fine powder comprising the step of reducing nickel hydroxide in the presence of phosphorus ions in such an amount that the molar ratio of phosphorus ions to nickel ions falls within the range of from 0.01 to 2 to give nickel fine powder as set forth in claim 1.

6. A method for preparing nickel fine powder comprising the step of reducing nickel hydroxide in the presence of phosphorus ions in such an amount that the molar ratio of phosphorus ions to nickel ions falls within the range of from 0.1 to 2 to give nickel fine powder as set forth in claim 2.

7. The preparation method of claim 5 wherein the nickel fine powder is prepared by mixing an aqueous solution of a nickel salt with an aqueous solution of an alkali hydroxide to form nickel hydroxide and reducing the nickel hydroxide to give nickel fine powder and wherein a phosphorus ion source is added to the reaction system in any production stage and the reduction is carried out in the presence of phosphorus ions in such an amount that the molar ratio of phosphorus ions to nickel ions falls within the range of from 0.01 to 2.

8. The preparation method of claim 6 wherein the nickel fine powder is prepared by mixing an aqueous solution of a nickel salt with an aqueous solution of an alkali hydroxide to form nickel hydroxide and reducing the nickel hydroxide to give nickel fine powder and wherein a phosphorus ion source is added to the reaction system in any production stage and the reduction is carried out in the presence of phosphorus ions in such an amount that the molar ratio of phosphorus ions to nickel ions falls within the range of from 0.01 to 2.

9. The preparation method of claim 5 wherein the phosphorus ion source used is phosphoric acid, ammonium phosphate, ammonium hydrogen phosphate, sodium hydrogen phosphate, potassium phosphate, sodium phosphate, phosphorous acid, potassium phosphate, sodium phosphate, hypophosphorous acid, potassium hypophosphite, calcium hypophosphite, or sodium hypophosphite.

10. The preparation method of claim 6 wherein the phosphorus ion source used is phosphoric acid, ammonium phosphate, ammonium hydrogen phosphate, sodium hydrogen phosphate, potassium phosphate, sodium phosphate, phosphorous acid, potassium phosphite, sodium phosphite, hypophosphorous acid, potassium hypophosphite, calcium hypophosphite, or sodium hypophosphite.

11. The preparation method of claim 7 wherein the phosphorus ion source used is phosphoric acid, ammonium phosphate, ammonium hydrogen phosphate, sodium hydrogen phosphate, potassium phosphate, sodium phosphate, phosphorous acid, potassium phosphite, sodium phosphite, hypophosphorous acid, potassium hypophosphite, calcium hypophosphite, or sodium hypophosphite.

12. The preparation method of claim 8 wherein the phosphorus ion source used is phosphoric acid, ammonium phosphate, ammonium hydrogen phosphate, sodium hydrogen phosphate, potassium phosphate, sodium phosphate, phosphorous acid, potassium phosphite, sodium phosphite, hypophosphorous acid, potassium hypophosphite, calcium hypophosphite, or sodium hypophosphite.

* * * * *